United States Patent
Shah et al.

[19]

[11] Patent Number: 6,041,325
[45] Date of Patent: Mar. 21, 2000

[54] SYSTEM AND METHOD FOR CONTROLLING ACCESS TO A TELEPHONY DATABASE

[75] Inventors: Tasvir Shah, Irving; Mark A. Harrison, Fort Worth; Matthew Bilbo, Bedford, all of Tex.

[73] Assignee: Alcatel USA Sourcing, L.P., Plano, Tex.

[21] Appl. No.: 08/948,161

[22] Filed: Oct. 9, 1997

[51] Int. Cl.[7] ............................... G06F 17/30; G06F 3/14
[52] U.S. Cl. ......................... 707/10; 707/102; 345/333
[58] Field of Search ........................ 707/1–10, 100–104, 707/200–206; 345/326–334, 339, 357; 709/203, 213, 219, 223; 379/16, 211, 212, 230, 219, 220, 305, 201, 265

[56] References Cited

U.S. PATENT DOCUMENTS

| | | | |
|---|---|---|---|
| 5,455,853 | 10/1995 | Cebulka et al. | 379/201 |
| 5,495,567 | 2/1996 | Iizawa et al. | 345/334 |
| 5,628,004 | 5/1997 | Gormley et al. | 707/104 |
| 5,727,057 | 3/1998 | Emery et al. | 379/211 |
| 5,737,533 | 4/1998 | De Hond | 709/219 |
| 5,806,057 | 9/1998 | Gormley et al. | 707/1 |
| 5,859,972 | 1/1999 | Subramaniam et al. | 709/203 |
| 5,878,418 | 3/1999 | Polcyn et al. | 707/10 |
| 5,913,029 | 6/1999 | Shostak | 395/200.33 |

FOREIGN PATENT DOCUMENTS

| | | | |
|---|---|---|---|
| 9405111 | 3/1994 | WIPO | H04M 11/00 |
| 9744943 | 11/1997 | WIPO | H04M 3/42 |

OTHER PUBLICATIONS

M. Genette, et al., "Intelligent Network: the Service Creation Environment", Commutation & Transmission, vol. 17, No. 2, Jan. 1, 1995, pp. 13–20.

P. Fregelius, "Neue Dienste und Anwendungen dank Intelligentem Netz", Tec. Das Technische Magazin Von Ascom, No. 2, Jan. 1, 1992, pp. 16–20.

PCT Search Report, dated Feb. 15, 1999.

*Primary Examiner*—Ruay Lian Ho
*Attorney, Agent, or Firm*—Baker Botts L.L.P.

[57] ABSTRACT

A flexible service management system creates, provisions, customizes, and restricts service offerings available on an intelligent network. A service creation environment has a schema query, service screen builder, and logic analyzer that cooperate to create a service screen definition. The service screen definition supports graphical user interfaces that interface with a telephony database. The service screen definition is deployed to a service management system within a service definition package, the service management system interfacing with a telephony database storing telephony data for supporting a service. The service screen definition enables a screen interpreter that can reside on a service management access point to communicate and transact data with the telephony database. The screen interpreter interprets the service screen definition to allow and control access to telephony data and to direct provisioning of services to network elements, such as a service control point, that perform service functions according to customized subscription data in the telephony database. The graphical user interface can communicate through the world wide web to allow customer or other data entry operator access to data on a filtered or restricted basis.

33 Claims, 8 Drawing Sheets

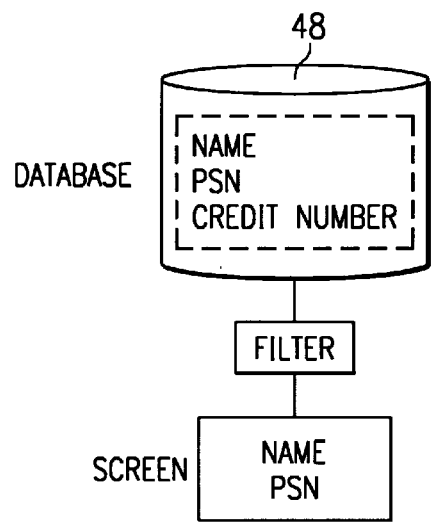
FIG. 5
FIG. 5A
FIG. 5B
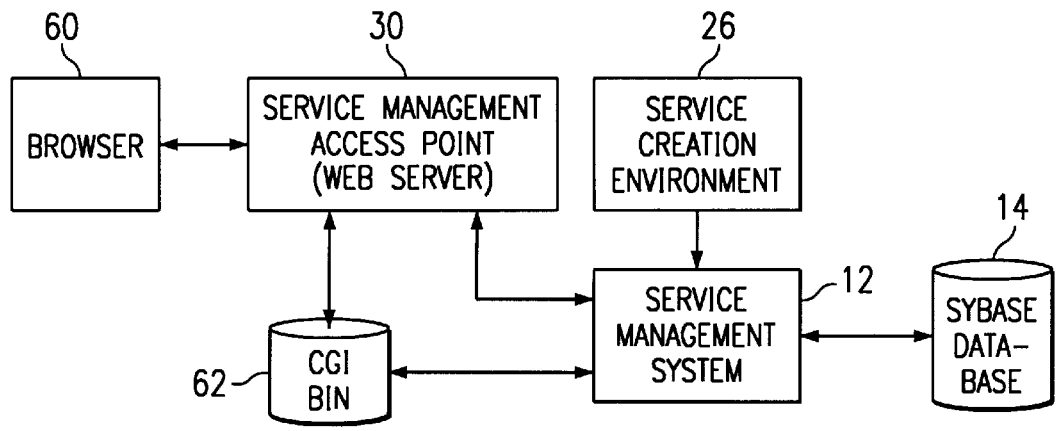
FIG. 6

SYSTEM AND METHOD FOR CONTROLLING ACCESS TO A TELEPHONY DATABASE

RELATED APPLICATIONS

This application is related to U.S. patent application Ser. No. 08/948,160 entitled "System and Method for Supporting Flexible Telephony Service Management" filed on Oct. 9, 1997; and U.S. patent application Ser. No. 08/947,693 entitled "Service Management Access Point" filed on Oct. 9, 1997.

TECHNICAL FIELD OF THE INVENTION

This invention relates in general to the field of telephony communications, and more particularly to a system and method for flexibly managing telephony services on a telephony network.

BACKGROUND OF THE INVENTION

Telecommunication companies frequently sell access to physical network telephony communication infrastructure and to telephony services related to the efficient use of such infrastructure. In offering services, the telecommunication companies have increasingly allowed individuals outside their corporate boundaries with options for customizing, restricting, and provisioning the services. An increasing number of companies are entering the telephony service bureau market to sell services by leasing "space" on network infrastructures from network operators. This service market treats physical telephony networks as a commodity which the service bureaus lease from network providers. Service bureaus acquire service technology to solve business telephony needs and then resell access to the technology solution to other telecommunication providers.

One example of a service typically sold by a service bureau is a toll free "800" number such as, for instance, the toll free number frequently used by mail order businesses that sell consumer goods. A consumer can order goods from a mail order company by dialing one toll free number. The consumer's call is routed to a central processor, such as a service control point. The central processor associates the 800 number dialed by the consumer with the physical location of the mail order company on the network and provides a number for that location to a switch, which routes the consumer's call to that physical location.

Presently, a service subscriber like the mail order company described above, must rely on a service operator to set up and provide the toll free service. The service operator must coordinate with the network operator to provision the service to the central processors on the network. However, creating and provisioning a service on a network can involve complicated software programming and development. Small changes to the service can require extensive programming to enable service logic features and rules on the central processor. This programming is generally accomplished in object oriented C++ software language, and can take six to nine months from the beginning of development until deployment is accomplished on a given network.

Another difficulty related to the creation and provisioning of a service is the service's interaction with the telephony database of the network operator. A single service may have to extract and use data fields from as many as fifteen to twenty separate tables of the telephony database. Network operators have accumulated these databases over time without necessarily intending to make these databases available to third parties such as service operators and service subscribers. Accordingly, these databases may be arranged in non-user friendly formats which require extensive training to understand and use.

For instance, in a typical database, one table can contain a customer's name, telephone number and billing information in separate entry fields in which each field is identified by a unique acronym label. A separate table can contain telephone numbers with each telephone number having associated data identifying particular options associated with the telephone number, such as call waiting or call forwarding, again with each field identified by a unique acronym label. A data entry operator would have to know how to access and understand each table and each acronym in a database to provide assistance to a service subscriber seeking, for instance, to have a call waiting service enabled for his telephone number. Further, the data entry operator would have complete access to the database, including access to sensitive data, such as credit information, even though the data entry operator has no need for access to this sensitive information to enable the service.

SUMMARY OF THE INVENTION

Therefore, a need has arisen for a flexible service management system to create customize, restrict and provision telephony services onto a telephony network with minimal software programming and with maximized direct interaction by service operators, service providers, or service subscribers.

A further need has arisen for a service management access point that can provide direct access to selected telephony database fields for service customization by a service operator, service provider, or service subscriber, without requiring alterations to the service by the network operator.

A further need has arisen for a system and method to generate graphical user interfaces with logic to support interactions with a telephony database for supporting customization and provisioning of a telephony service on a telephony network.

A further need has arisen for a system and method for controlling access to a telephony database to allow user-friendly interaction to portions of the telephony database having sensitive data while restricting access to the sensitive data itself.

In accordance with the present invention, a system and method for flexibly managing services on a telephony network is provided that substantially eliminates or reduces disadvantages and problems associated with previously developed means of providing services on a telephony network. A service management system interfaces with a telephony network to support a telephony service defined in an associated service definition package. The service management system accepts telephony data for supporting the telephony service. The service management system then validates the telephony data for consistency with the service and the telephony database, including validation of the data's consistency with service exclusions and interactions, and the data's consistency on a field level and a record level, such as the data's referential integrity. The service management system next stores the telephony data, thus acting as a master database for the telephony network. The telephony data can include different versions of services and the status of data for a service, such as active, sending, pending or saved status. The service management system then downloads the telephony data to, for instance, provision the service or activate the service on network elements such as the service control point.

Also in accordance with the present invention, a service management access point is provided that substantially eliminates or reduces disadvantages and problems associated with previously developed means of interacting with a telephony network to manipulate a telephony service. The service management access point allows a physical interface with a network by a service operator, service provider or service subscriber that permits customizing, restricting, and provisioning services on a telephony network. A data entry device interfaces with a telephony database through graphical user interfaces generated with a screen interpreter located on the service management access point. The screen interpreter interacts with a service screen definition located in the service definition package on the service management system to create service view screens that map telephony data from a table-based schema to a user-friendly service view. A data entry user can customize a service by building a service profile having predetermined service features, or by building a service script with service features from the service definition package or the service profile. The user can input service specific subscription data to enable service features. The service management access point can filter telephony data to restrict viewing, or to restrict changes to viewed data. The user can provision a customized service, including a new service or changes to an existing service, through the service management access point's interaction with the service management system.

Also in accordance with the present invention, an interface is provided for controlling access to a telephony database that substantially eliminates or reduces disadvantages and problems associated with previously developed telephony database interfaces. A service creation environment allows engineering of graphical user interface through a service screen definition included in a service definition package that is deployed to a telephony network. A screen builder builds the service screen definition according to directions from a schema query, which identifies telephony data for supporting a telephony service according to a predefined telephony database schema. A logic analyzer creates executable code to support interaction between a screen interpreter and the telephony database according to the schema query and the predefined schema, and cooperates with the schema query and screen builder to insert the executable code into the service screen definition. The service screen definition can be deployed to a service management system to cooperate with a screen interpreter for supporting interaction with a service on a network.

More specifically, the present invention allows creation of a service in a service creation environment by a service designer. The service creation environment passes a service definition package to a service management system. The service definition package can include a service management program for administering the service, a service logic program for executing the service, a description of the GUI screens used to provision the service, a database schema to support the service, the service global rules, parameters, and variables, a profile containing the constraints for the service, and the service feature descriptions. The elements of the service definition package can be arranged as system building blocks which can interact to customize, provision and restrict service offerings.

The service management system acts as a master database for intelligent network elements which can interact with network infrastructure. The service management system accepts the service definition package from the service creation environment and coordinates provisioning of the service to the network elements. The service management system provides access to telephony databases for service providers, service operators, and service subscribers. In one embodiment, the service management system allows service engineering after deployment of the service definition package to create a secondary service definition package comprised of elements of the deployed service definition package. The service management system accepts, validates and stores data input by the service operator, provider or subscriber and then provisions the data to network elements, such as a service control point, for implementation of the service by the network. The service management system can also track and log errors generated by data or otherwise.

A service management access point can interface with the service management system and plural data input devices, thus acting as a server to enhance interaction of service operators, providers and subscribers with the service management system. A display manager has a service profile manager for managing user access to service features with the service definition interface that coordinates with the service screen definition for building a service script, and a screen interpreter cooperating with service screen definitions to interpret service screen definitions for supporting graphical user interface displays for telephony data transactions. The service management access point can provide a world wide web or native screen interpreter to collect data from compatible data entry devices for creating, modifying and deleting service providers, provisioning services, mediating data access according to a user's service rule and generating and provisioning specific scripts for subscribers to detail service features that are commissioned by that subscriber. The service management system can support the screen interpreter's production of graphical user interfaces with a security subsystem for monitoring telephony data access according to a user's access level; a traffic metering and metrics subsystem and a statistics and reporting subsystem for monitoring and reporting access activity through the service management access point; a database subsystem for supporting telephony database transactions; and a system building block subsystem for contributing generic functions to service management access point subsystems.

The service creation environment allows a service designer to input a schema query which identifies data from a predefined database schema, the data corresponding to data needed to create and execute a service. The schema query interacts with a screen builder to direct the screen builder to assemble a screen display having a desired arrangement of data for display on an interface. A logic analyzer generates and combines executable code with the output of the screen builder to create a service screen definition. The logic analyzer creates executable code based on the schema query so that the service screen definition supports a screen interpreter to interact with the service management system and the telephony database after the service screen definition is deployed with the service definition package.

The present invention provides important technical advantages by allowing flexible service programming to take advantage of network element capabilities through efficient logic-driven provisioning of data to optimize telephony resources and speed.

Another important technical advantage of the present invention is allowing customization of a service by a service operator, service provider, or service subscriber through a user-friendly interface. The customization can be accomplished without the generation of additional software code since the service operator, provider, or user can customize a service by enabling particular arrangements of system building blocks located on the service management system or associated with the service management access point.

Another important technical advantage of the present invention relates to the speed and simplicity of provisioning a service on a network. A service operator can create service profiles with predetermined features selected from a service definition package, and can resell the features to a service provider. The service provider can assign profiles to subscribers. The service subscribers can develop a service script and provision subscription data without having to rely on technical assistance. In this way, a service subscriber can initiate and operate a service in a timely manner, and a service operator and provider can collect revenues on the service as soon as the subscriber initiates the service. Further, a subscriber can add, change or delete a service through a direct interface with the service management access point by, for instance, using a world wide web interface.

Another important technical advantage of the present invention is that access to the telephony database can be restricted based upon a user's predefined access level. For instance, the service management access point may accept user identity data indicating an access level to allow a service operator to change features associated with a service; allow a service provider to restrict available features for particular service subscribers only; or allow service subscribers to select particular features without allowing access to other services.

A further technical advantage of the present invention is that it can present a service view, as opposed to the table view associated with the telephony databases. The service view can include data spanning more than one table of a telephony database. The service view can prevent data operators from accessing and viewing certain sensitive data such as credit data. Alternatively, the service view can allow viewing of telephony data but prevent changes to the data for predetermined access levels.

A further technical advantage of the present invention is the creation of a user-friendly service view that reformats data and labels to allow easy access by data input operators without specific training in telephony. For instance, a telephony database can be presented in a service view with instructions to eliminate confusion and to present selected data from a variety of tables.

Another advantage of the present invention is that a single program in the service creation environment can generate a large number of operator screens with independent service screen definitions. The inclusion of executable code in the service screen definition increases the flexibility of the service creation environment for creating graphical user interfaces for use by service providers, operators and subscribers interacting with the service management system.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIGS. 5, 5A and 5B depict the functional steps performed by the present invention to present a service view of filtered telephony data;

FIG. 6 depicts a schematic block diagram of one embodiment of a service management access point interfacing with a telephony database associated with a service management system;

DETAILED DESCRIPTION OF THE INVENTION

Preferred embodiments of the present invention are illustrated in the figures, like numerals being used to refer to like and corresponding parts of the various drawings.

I. Intelligent Network Services

Advanced intelligent network telephony systems, such as the AINFusion system sold by DSC Communications, have enhanced and simplified the services available to telephony customers. Intelligent network systems use intelligent network elements distributed across the intelligent network to create, provision and operate services in an efficient and timely manner.

A. Network Elements

Figure 1:
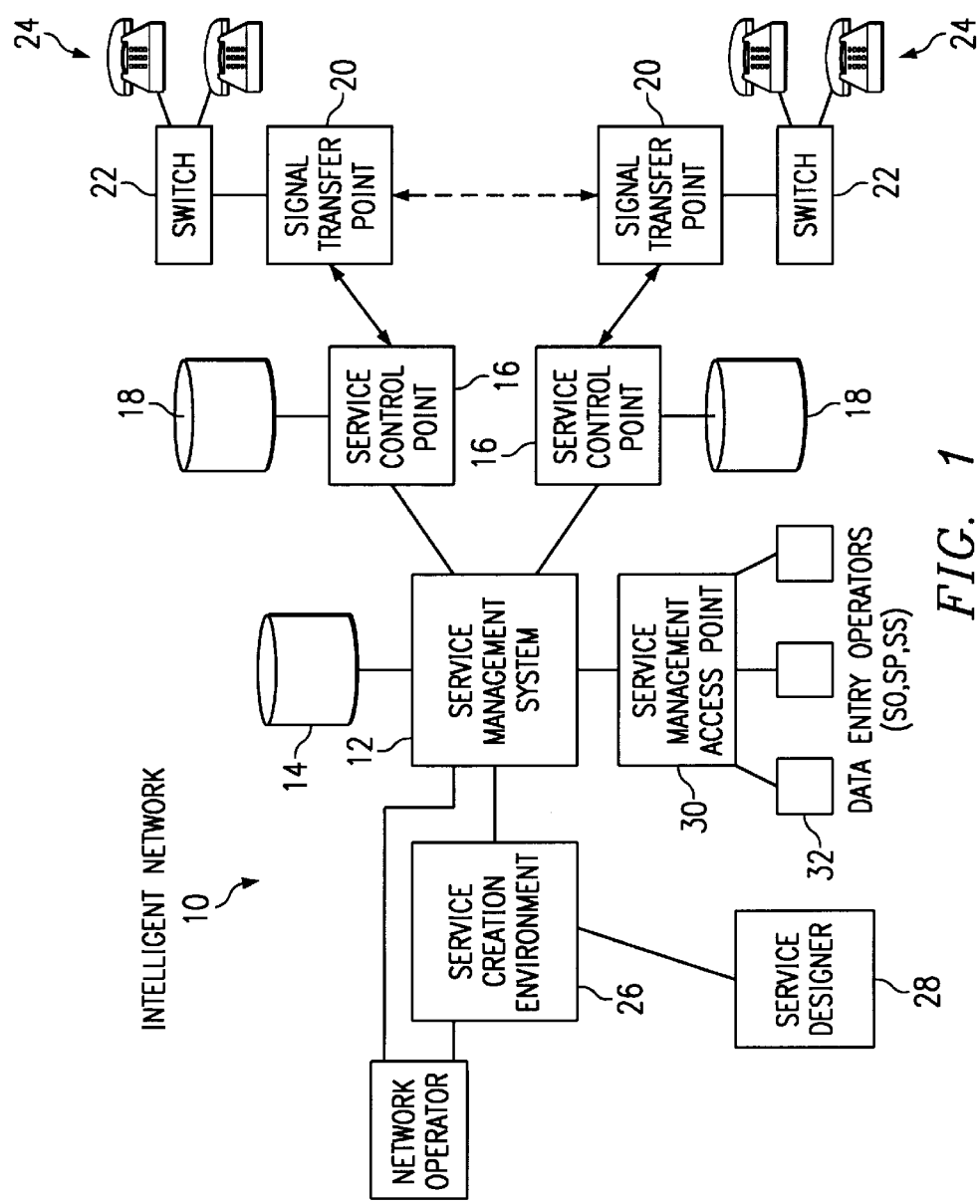
FIG. 1 depicts a schematic diagram of the present invention incorporated in an intelligent network.

Referring now to FIG. 1, a schematic diagram of an intelligent network 10 having network elements to perform flexible service management provides an overview of the operation of the present invention within a telephony network. A service management system 12 having an associated data storage device 14 acts as the master database for the network elements of the intelligent network 10 and coordinates provisioning of services to the network elements. Service management system 12 can be any processor with interfaces and associated peripherals to support communication along intelligent network 10. For instance, service management system 12 can be a SPARC workstation produced by Sun and adapted to operate with common object request broker architecture ("CORBA").

Service management system 12 interfaces through intelligent network 10 with one or more service control points 16. Each service control point 16 has an associated data storage device 18 for storing intelligent network telephony data to operate predetermined services. Service control point 16 can also be a Sun SPARC workstation having interfaces and adequate processing capabilities to manage a predetermined level of network activity.

Each service control point 16 interfaces through intelligent network 10 with one or more signal transfer points 20. Each signal transfer point 20 interfaces with one or more switches 22, which in turn interface with one or more telephony devices such as telephones 24. When a telephone 24 directs a communication, such as a telephone call directed at a particular telephone number, switch 22 can either direct the telephone call to an associated telephony device or can direct the telephone call to a signal transfer point 20 where the telephone call can in turn be directed to another signal transfer point, a switch, or a telephony device. Signal transfer point 20 communicates with service control point 16 when necessary to obtain instructions for directing a call due to, for instance, the call's initiation of a service.

B. Service Operations

One example of the elements of intelligent network 10 cooperating to provide a service to a customer can be illustrated by describing the steps involved in directing a toll free 800 telephone call. A consumer inputs the 800 phone number into a telephone 24, which directs the 800 number to switch 22. Switch 22 provides the 800 number to signal transfer point 20, which in turn passes the 800 number to service control point 16. Service control point 16 searches data storage device 18 to determine the identity of the telephony device 24 to which the telephone call should be directed. The identity of the end point of the telephone call can vary dependent upon a number of predetermined conditions, including the time of day, the origin of the call, the quantity of calls directed to the end point of the telephone call, and any of a number of other factors. Once the actual end point of the 800 call has been determined, the service control point 16 provides the end point of the call to signal transfer point 20 which communicates through switch 22 to operationally direct the call to the end point.

Service management system 12 generally does not actively participate in the operational aspects of a service, but rather operates as a central source of the data needed by service control point 16 to perform the service. Data is downloaded to the service control point, which has an operational database to enable service features according to subscription data. Service management system 12 thus acts as a master database for providing data to service control point 16, and includes a service management program to manage provisioning of services, including management of telephony data to support the service, to service control point 16.

II. Service Roles

Figure 2:
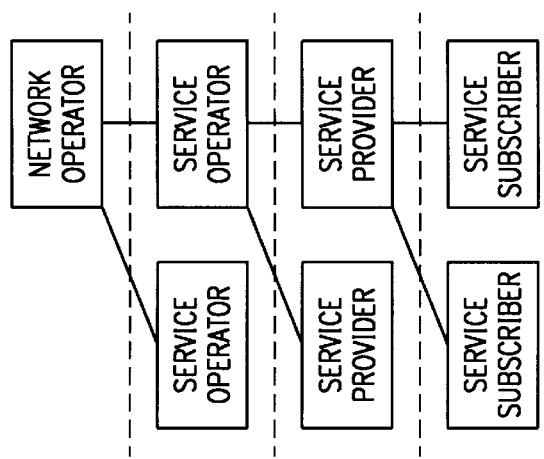
FIG. 2 depicts four primary roles related to the delivery of a service on a network according to the present invention.

Referring to FIG. 2, four primary roles associated with implementation of a service according to the present invention are depicted.

A. Network Operator Role

In the first role, the network operator of intelligent network 10 defines the service on the service creation environment in the form of a service definition package having service logic, service features and global service rules. The network operator can electronically deploy the service definition package to the service management system 12 for use by any number of service operators.

B. Service Operator Role

In the next role, one or more service operators can create new service definition packages from the first service definition package defined by the network operator, or can create service profiles from the service features in the first or succeeding service definition packages. For instance, the service operator can enable features for an 800 number such as origin dependent routing, time dependent routing, and call forwarding.

The service operator can provide separate service profiles for a number of service providers, and can store and maintain the service profiles in a service provider database associated with the service management system. For instance, if a service provider commissions only origin dependent routing and time dependent routing, the service operator would allow that service provider to access a predetermined service provider database, for instance by using the service management access point, with only those service features enabled. Advantageously, a service operator can update service provider databases as new technology is developed and sold, and parse out service features by creating and supplying service providers with access to plural service definition packages. Under present service architectures, network operators frequently perform functions described herein under the role of the service operator.

C. Service Provider

In the third role, a service provider can select service feature definitions from service profiles to create a service for sale to service subscribers. One or more services can be created. For instance, the service provider can use service management access point 30 to enable his commissioned service profile, which can allow the service provider to select origin dependent routing and time dependent routing to create an 800 Deluxe Service; or, alternatively, the service provider can select only time dependent routing to create an 800 Basic service.

D. Service Subscriber

The fourth role is filled by one or more service subscribers, who purchase and use services, for instance by accepting calls directed to a toll free number. The subscriber can create a service script which determines the order in which specific service features will be executed. The service management access point can allow the subscriber to directly provision parameters with subscription data, meaning without the assistance of a service provider or service operator. The service subscriber can save particular parameters for a given service script by storing subscription data in isolated databases on the service management system.

III. Creation of a Service

Service management system 12 receives a service definition package that can be created in a service creation environment 26 by a service designer 28. The service definition package comprises a service management program for administering the service and provisioning the service to network elements of intelligent network 10; a service logic program which enables execution of the service by service control point 16; service screen definitions of the graphical user interface screens required to subscribe and provision the service; a database schema to support service transactions with the telephony database; service global rules, parameters, and variables; a profile containing the constraints for the service; and service feature descriptions.

A. Service Creation Environment Components

Figure 3:
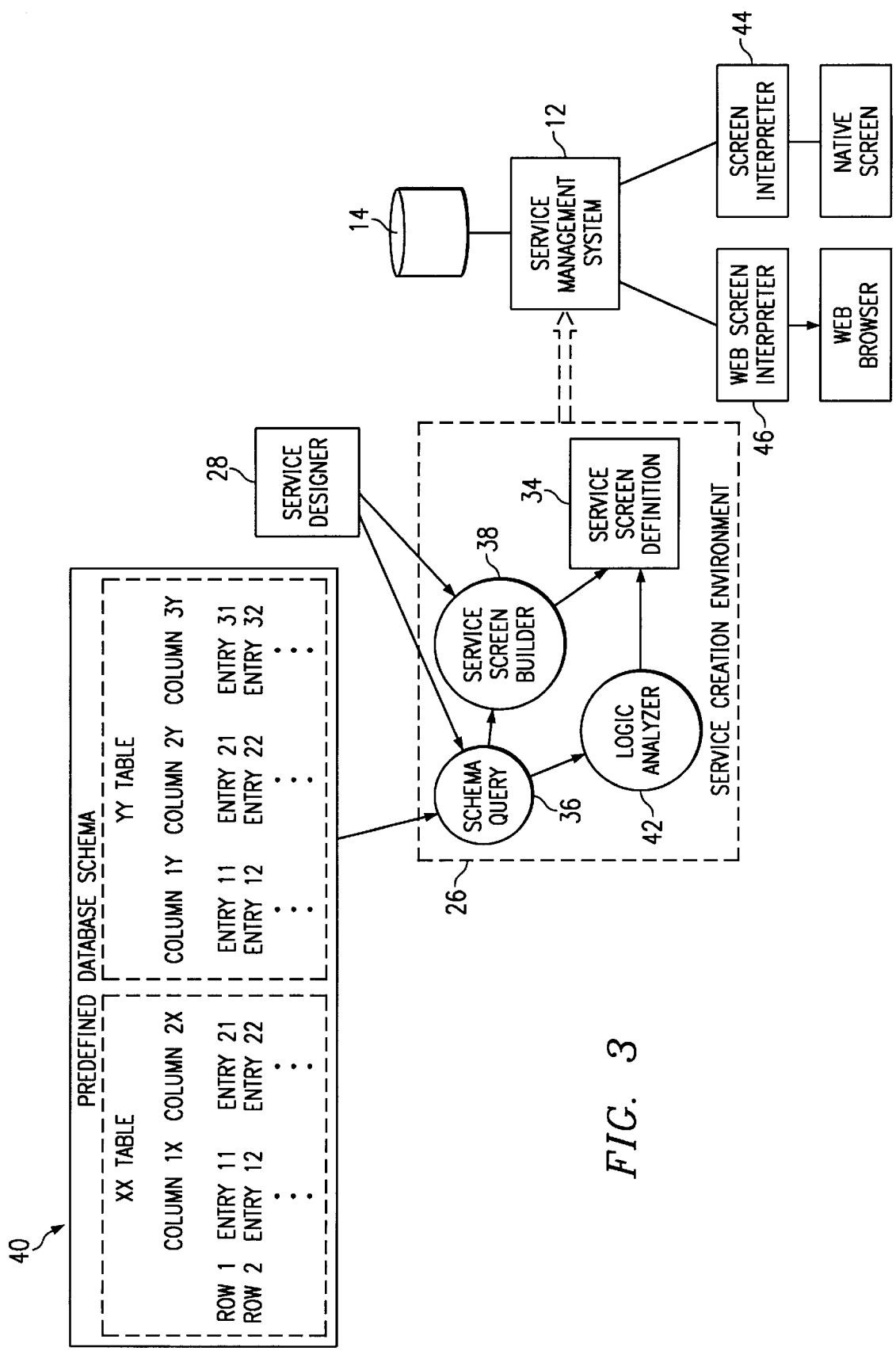
FIG. 3 depicts a schematic block diagram of service creation environment components for defining a service.

Referring now to FIG. 3, a system and method for creating a service screen definition 34 is depicted. Service screen definition 34 enables graphical user interfaces on service management system 12 to support flexible service management. Service designer 28 provides service functions and related database information to a schema query program 36 and a service screen builder 38. Schema query program 36 is also provided with the predefined database schema 40 for one or more telephony databases having data needed for the desired service. Schema query program 36 is a software program enabled in object oriented language such as C++. Service screen builder 38 can be a commercially available screen builder such as Spectel which is marketed by Sun. Schema query program 36 interfaces with screen builder 38 to specify the screen which screen builder 38 assembles for a particular service or feature. Schema query program 36 actually drives screen builder 38 to automatically build a desired screen display without requiring service screen builder 38 to communicate directly with database schema 40.

A logic analyzer 42 accepts data from schema query 36 and creates program logic to enable screens to communicate with the service management system and service control point databases. Logic analyzer 42 generates executable code for intelligent database interaction and stores the executable code with the output of service screen builder 38 into the service screen definition file 34. Service screen definition file 34 can be provided to service management system 12 when the service definition package is deployed.

Figure 4:
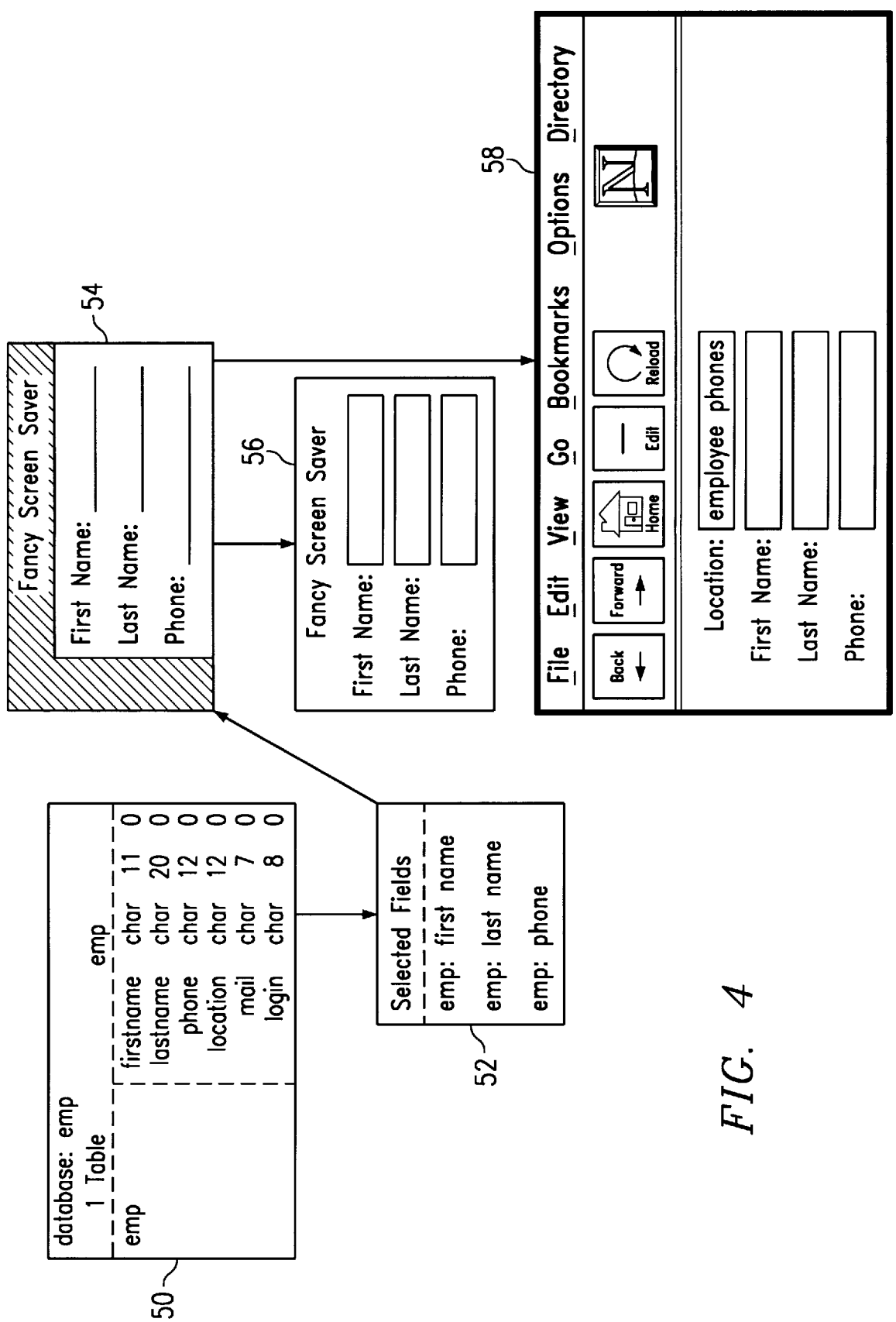
FIG. 4 depicts screens that implement the creation of a service screen definition.

Referring to FIG. 4, some examples of screens used by the present invention to engineer graphical user interfaces for a service are illustrated. A database schema screen 50 depicts the predefined table view of a database schema having one table relating to employee phone numbers, and shows the fields available for use by a service. The logic analyzer screen 52 shows the fields selected by a service designer for the logic analyzer to identify in the service screen definition. The logic analyzer directs the screen builder to include executable code in a screen-builder screen 54, which allows the service designer to arrange a graphical user interface. The screen definition resulting from the selection by screen-builder 54 allows a native screen display 56 or a world wide web display 58, each display having a service view.

B. Service Definition Package Deployment

After service designer 28 creates the service definition package, service creation environment 26 can transfer the service definition package to service management system 12 by tape, or by electronic transmission. At deployment, previous versions of the service, if such versions exist, can optionally be retained. The service management program is installed to manage service provisioning, and database structures required to provision the service are created. The service feature information is stored in a database, and service global rules, parameters and variables are initialized. Finally, information for generating local service provisioning screens is extracted to allow the service management access point to interface with the service management system.

Once service screen definition file 34 is available on service management system 12, service screen definition file 34 can act as a map to transfer information from data entry operator screens into telephony databases, and to transfer information from the telephony databases to the screen. Service screen definition file 34 can operate through screen interpreters 44 and 46, or can operate through service management access point 30. The executable code created by logic analyzer 42 enables a screen interpreter to display graphical user interfaces on screens according to a predetermined screen layout and to communicate with a telephony database storage device 14 or service control point database in storage device 18. In one embodiment, a screen interpreter can use HTML format to allow direct service subscriber access to database 14 through the world wide web without service operator or service provider assistance. Direct customer access can eliminate the need to perform batch updates to database 14, allowing near instantaneous enablement of services and modification of existing services.

IV. Service Management Access Point Functions

A service management access point 30 interfaced with service management system 12 can use service features created in the service creation environment through graphical user interfaces supported by the service screen definitions to direct subscription and provisioning of all or part of a service to network elements such as service control point 16. Data entry operators can interface with service management access point 30 by using, for example, native screen interpreters, or a web screen interpreter.

A. Data Operator Interaction

The service management access point can identify the level of access for each data entry operator 32 dependent upon security information associated with the data entry operator. Service management access point 30 can accept instructions from data entry operators 32 to direct the service management system to provision services on intelligent network 10. With user-friendly graphical icons, service management system 12 can accept and provision particular service features and generate a report for each data entry operator 32 or for each service used.

Referring to FIG. 5, several important functions available through a service management access point's use of service screen definitions created by the service creation environment are depicted, including the ability to span tables and produce a service view, and the ability to filter telephony data. A telephony database 48 uses labels to identify stored data, including a name label, PSN label, credit number label, call waiting label, and call forwarding label, with the data located in two separate tables, an identification table and a services table. In pre-existing systems, a data entry operator would have to call up each table of the database in order to enable call forwarding for Mark at telephone number 96517. The data entry operator would need familiarity with the layout of the database, including the identification and services table, in order to locate data in the services table based on Mark's PSN. Further, in the process of enabling call forwarding, the data entry operator would view Mark's credit information.

The service screen definition file allows a service view, an example of which is depicted in FIG. 5A, displayed in a user-friendly context while simultaneously filtering out Mark's sensitive credit data as depicted in FIG. 5B. Schema query 36 creates service screen definition file 34 by identifying the location in predefined database schema 40 of name, PSN, call waiting and call forwarding data. Schema query directs service screen builder 38 to assemble the desired data in a user-friendly service view format of FIG. 5A, including a translation of the PSN acronym into a more easily understood "phone number" description. Logic analyzer 42 accepts schema query data to create executable code in service screen definition file 34 which allows a data entry operator to point and click on call forwarding, in the example of FIG. 5A, in order to enable that service. The screen interpreter uses the executable code created by logic analyzer 42 to insert activation of call forwarding into database 14. Service management system 12 can then provision the newly activated call forwarding service to service control points 16 to enable call forwarding for Mark.

In one embodiment, the service view can prevent a data entry operator from changing the name and phone number entries for Mark's phone number by filtering data input by the data entry operator with executable code that associates user access levels with predetermined data classifications. In this way, the integrity of database 14 can be protected from unauthorized alterations. For instance, in one embodiment, a data entry operator could view call waiting as a service commissioned by Mark but the screen interpreter would prevent the data entry operator from changing the status of Mark's call waiting service. Thus, a service provider could obtain and use information about the services commissioned by Mark even if the service provider is unauthorized to assign the call waiting service

B. World Wide Web Interface

Referring now to FIG. 6, one embodiment of a service management access point acting as a world wide web server is depicted. A web browser 60, such as the Netscape web browser, requests screens from the service management access point 30 using TCP\IP and the HTTP protocol through an Internet or intranet interface. Service management access point 30 acts as a gateway to enable, manage, and control access to service management system 12 and the telephony database 14 associated with service management system 12. Service management access point 30 presents data operators or other users with Internet browser screens based on the user's access level to provide: the ability to provision services; the ability to create, modify, and delete service providers; the ability to represent service features as graphical icons; the ability to graphically represent selectable sets of service features; the ability to generate and provision a service subscriber specific service script which details service features commissioned by a subscriber; and the ability to generate reports based on a user's level of access.

C. Service Management System Interaction

The service management access point 30 utilizes service management system 12 as a database server allowing service management access point 30 to operate without databases physically residing on it. In the embodiment depicted in FIG. 6, service management access point 30 utilizes INFusion generic provisioning interface, available from DSC Communications Corporation, for transactions to a Sybase database 14 associated with service management system 12. The generic provisioning interface defines a set of messages to query and update the service management system resident Sybase database.

Database 14 also maintains tables specifically created to support service management access point administrative functions, such as a network operator, service operator, service provider, service subscriber, feature global data, branch constraints, and feature\icon cross reference tables. Operations to service management access point specific databases resident on database 14 can bypass the generic provisioning interface layer to directly leverage database primitive software objects located on service management system 12. Database primitives can implement in a generic fashion all low level database access functions required by the service management access point applications. An operations subsystem residing in service management access point common gateway interface directory 62 can support service management access point functional applications. For instance, in the embodiment depicted by FIG. 6, Sybase database primitives can be supported, including primitives to support: opening a connection to the database, database query, database entry creation, database entry modification, database entry deletion, database view creation, database view modification, and database view deletion.

D. Service Management Access Point Subsystems

Figure 7:
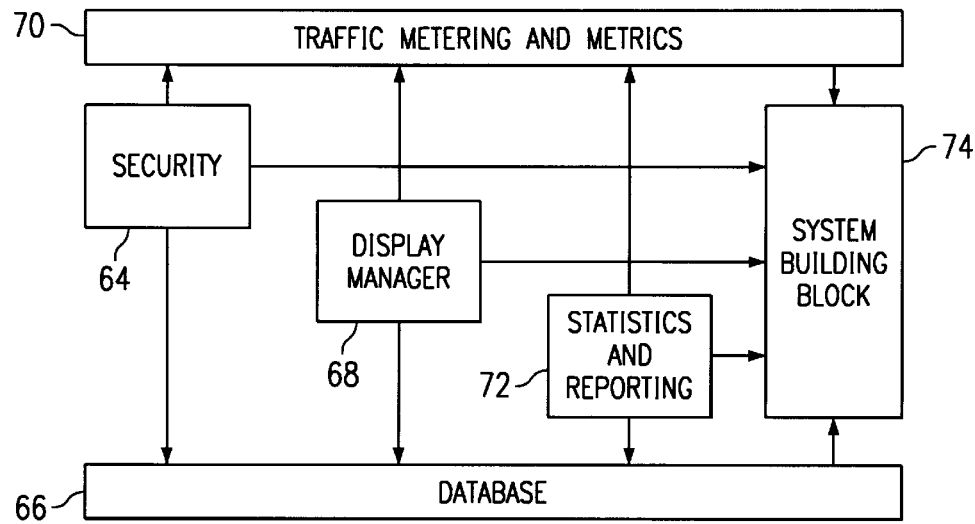
FIG. 7 depicts a schematic block diagram of one embodiment of the service management access point.

Referring now to FIG. 7, a schematic block diagram depicts subsystems that can support service management access point operations. A security subsystem 64 functions to guard against unauthorized access to telephony data throughout the life of a service management access point session. User access to telephony data can be associated with an access level determined by a user login or other user validation before a protected screen with sensitive data is served to a user. Service screen definition and security subsystem 64 can cooperate to prevent the display of sensitive data to unauthorized users by filtering such data according to a user's access level, and can also prevent a user from manipulating predetermined data classifications displayed to users with limited access levels to protect database integrity. Essentially, security system 64 cooperates with service screen definitions deployed by a service operator to filter data transactions that occur through service management access point 30.

Database subsystem 66 has a set of functions that implement a service management system generic provisioning client and low level routines to enable access to one or more remote database tables, such as Sybase tables. Database subsystem 66 routines are parameter driven to accept a set of known inputs, and to generate a standard set of returned codes using database primitives. Database subsystem 66 monitors the required parameters and return codes to determine and describe the success or failure of a database operation.

Display manager 68 manages all data sent to a data entry operator, such as data transactions through a web browser, and can include several display management applications, a web server, and common gateway interface programs. The display management applications can include a service profile manager and a graphical user interface logic interpreter, such as a screen interpreter for applying executable code inserted in the service screen definitions created by the logic analyzer in the service creation environment.

Within a service definition package, a user can reference initial screen layouts associated with service screen definitions and saved under unique identifiers. Display manager 68 can read initial screen layouts, attributes, and validation routines from the service management system and translate the screens into a format for data entry devices to accept, such as a browser format for web browsers to transmit to web compatible devices. A network operator can use this functionality to customize screens in a post-deployment service engineering process through the service creation environment to: assign pull down menus to prompts; assign values available for provisioning on a per prompt basis; assign graphical shortcuts, such as radio buttons, to fields; designate fields read only; remove the ability to view a prompt from the screen; and wrap the screen with corporate header, footer, and/or HTML frame information. Once the service engineering process is completed, particular screen formats and configuration files can be saved in telephony database 14 and packaged into uniquely identified service definition packages that can be assigned to service operators.

Each service definition package in the service management system can support a telephony service. Service operators can specify one or more services by building service offerings associated with each service. To support building of services with a service definition package, display manager 68 allows further customization of screens and the definition of service profiles comprised of service features available in a service definition package. Once a service profile is defined, it can be uniquely identified and stored in database 14 and accessed with display manager 68. Customization available to a service operator or service provider for specific services include the ability to remove access to specific prompts, the ability to designate additional fields as read only, the ability to limit or remove access to service features, the ability to further restrict valid input criteria, and the ability to limit feature activation frequency. Once a service operator or a service provider activates a particular service for an identified service subscriber, that subscriber can use display manager 68 to utilize the service for authorized service profiles. The service subscriber can interact with graphical user interfaces supplied by display manager 68 to build a service script and to define a service logic path based on branches defined in an assigned service profile.

Traffic metering and metrics subsystem 70 has a set of common routines to track accesses and operations of the service management access point. Traffic metering and metrics subsystem 70 can monitor and record data representing the number of times each graphical user interface is accessed through the service management access point, including the date and time of each access with a breakdown of the originating IP address and machine host name for each access. This traffic metering and metrics data is provided to statistics and reporting subsystem 72 when authorized users request historical, statistical, and provisioning reports.

System building block subsystem 74 has a library of commonly used routines to contribute to core generic functions of service management access point applications. For instance, system building blocks can support string manipulation functions, memory management functions, flat file input/output functions, time and date functions, and generic data validation routines.

V. Subscribing a Service According to a Script

The service management access point allows service negotiation with proper feature interactions. The service management access point reads subscriber data, and displays available services based on the subscriber's access level, network switch types and version numbers. The subscriber can select available services according to service exclusions and interactions, and can input subscription data to enable the service.

Figure 8A:
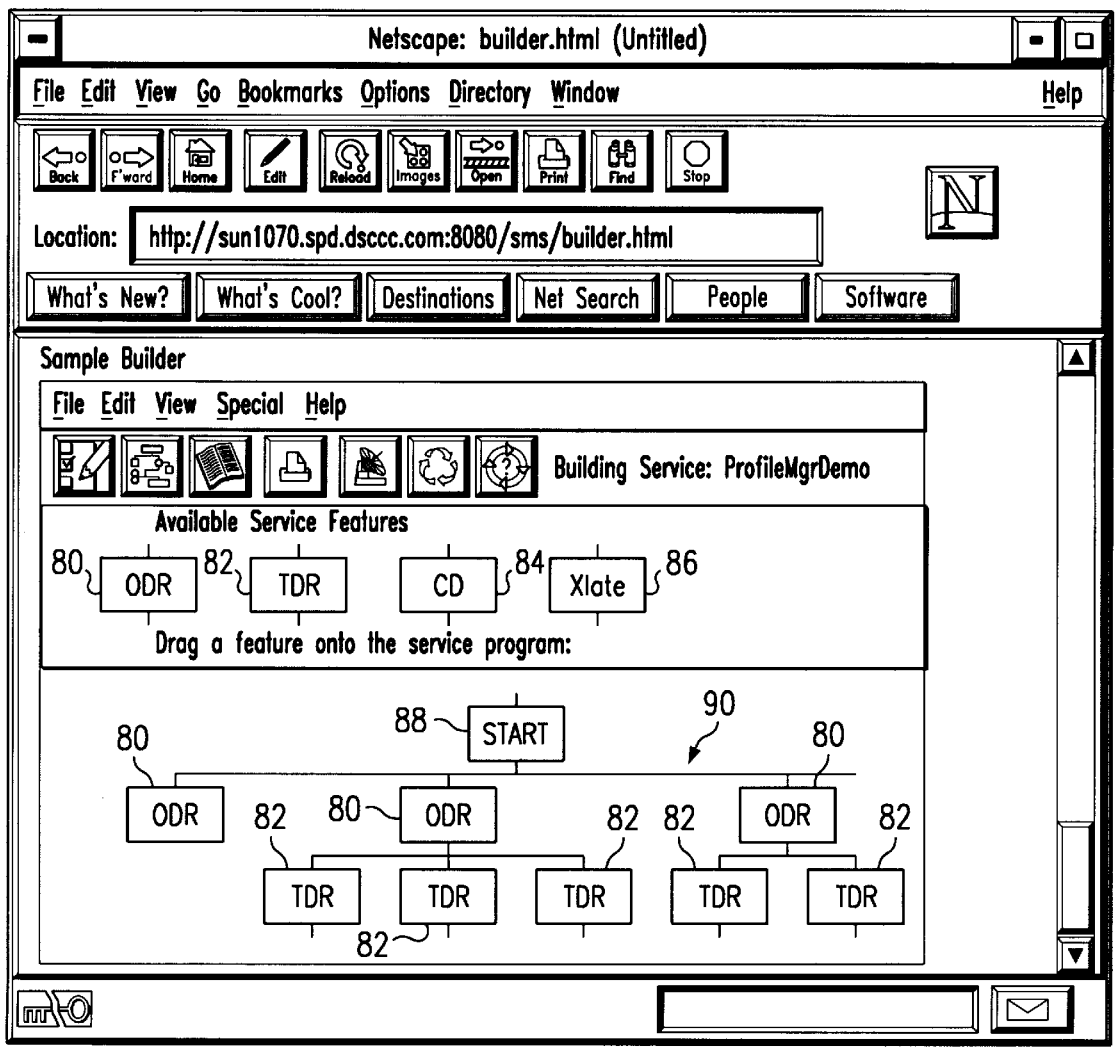
FIGS. 8A and 8B depict Web browser screens for creating and provisioning a service script through a service management access point.
Figure 8B:
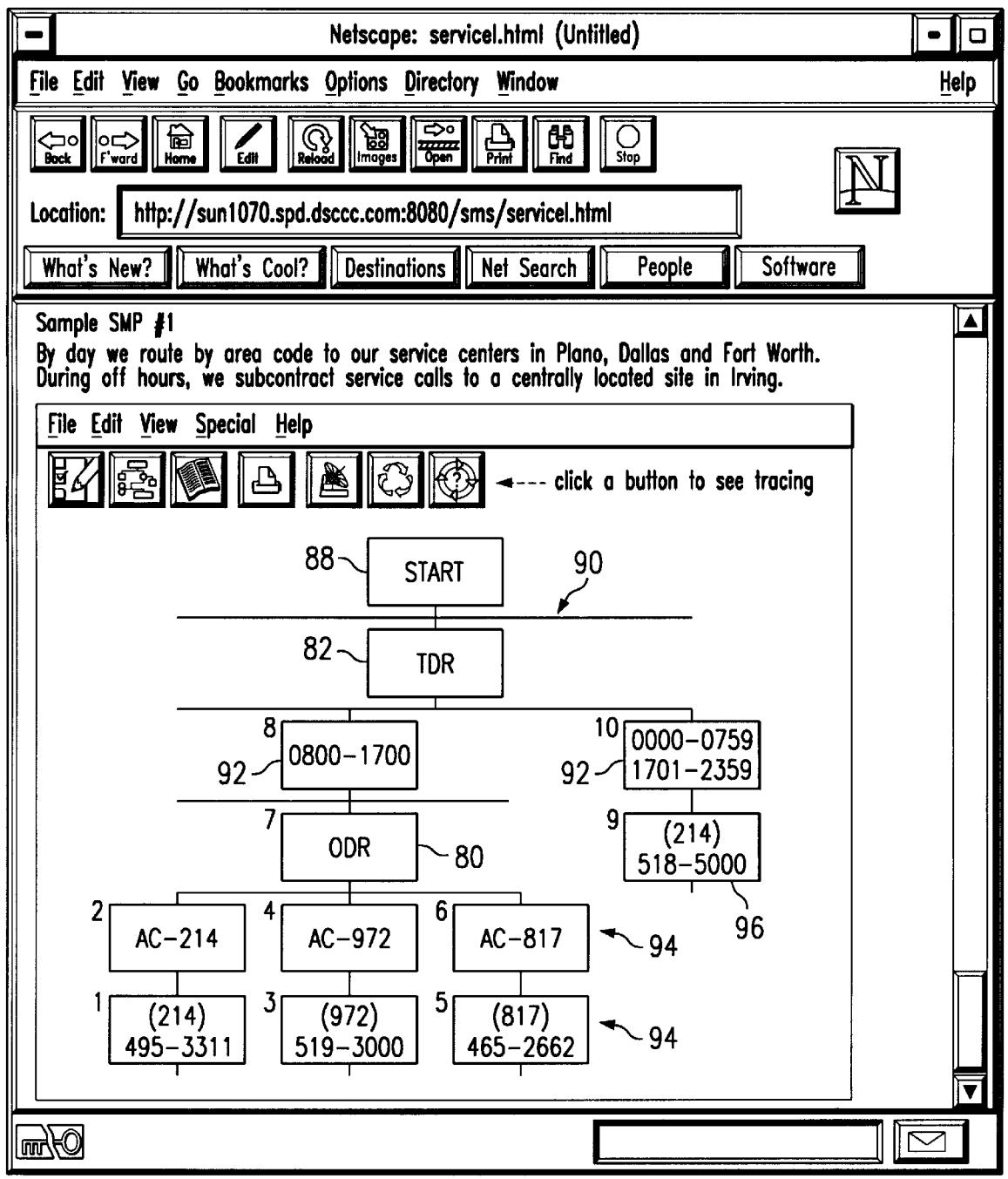

Referring now to FIGS. 8A and 8B, examples of screens which can be produced by screen display 68 for a browser associated with a data entry device are depicted. FIG. 8A depicts four service features 80 through 86 available in a service profile which a user can select as features for inclusion in a service script. A service entry point 88 is represented by an icon which initiates the definition of the service features into the service script. A data entry operator, who can, for instance, be a service subscriber or service provider, can select features 80 through 86 from the feature list by clicking and dragging a feature to a tree 90 extending from service entry point 88. As each feature is attached to tree 90, only those services which remain available from the service profile can be listed in the features list, thus limiting the user from selecting unavailable features. When the user has completed the definition of the service script, he can point and click to another icon to send the script to the service management system through the service management access point. The service management program associated with the service definition package accessed by the user can then provision the service to the network through the service management system.

Referring to FIG. 8B, when the service profile has defined a service logic path, the subscriber can use a graphical user interface similar to that of FIG. 8B to subscribe a service script with subscription data for enabling the service. From service entry point 90, a subscriber has subscribed to time dependent routing. With icon 82 the subscriber has input two time range values 92 which define the routing of calls during each respective time period. From 8:00 until 17:00, the subscriber has directed all calls according to origin depending routing icon 80. Thus, for instance, calls to the subscriber's 800 number at noon from the 214 area code will be routed to phone number (214) 495-3311. During times outside of the 8:00 to 17:00 range, calls to the subscriber's 800 number will be routed to time dependent routing data 96 which indicates phone number (214) 518-5000.

Figure 8C:
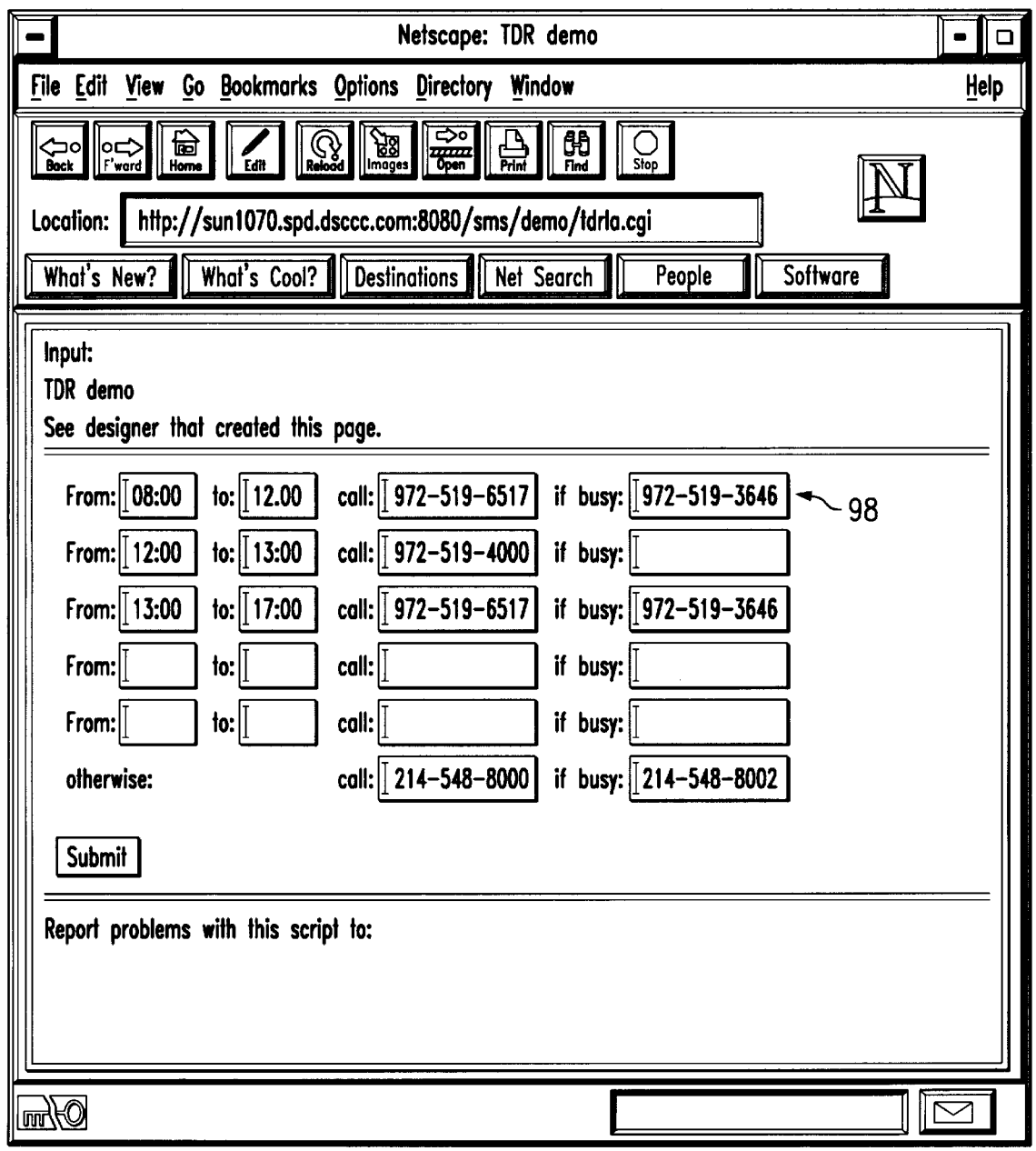
FIG. 8C depicts a Web browser screen for supplying subscription data through a service management access point.

Referring to FIG. 8C, another format of a graphical user interface for accepting subscription data is depicted. The subscriber can input subscription data for time dependent routing into data boxes 98. The service profile depicted in FIG. 8C allows the subscriber to use call forwarding if the number selected by time dependent routing is busy.

VI. Service Management System Functions

The service management system manages the flow of provisioning of a service to network elements and activation of the service on the network elements. In broad terms, the service management system acts as a master database to transfer telephony data for supporting one or more services on network elements, such as service control points. Once a service is provisioned and activated, the service management system does not generally participate in service logic on the network. To provision and activate service logic, the service management system performs four functions: accepts and collects data, validates the data, stores the data and downloads the data to the network in a provisioning process that enables and activates the services.

The service management system accepts data according to its data type, including the data's origin and purpose. For instance, the service management system identifies data as originating from a service operator, provider or subscriber. The service management system can also identify data as subscription data for a specific service, service logic such as global variables or rules, and network data which applies to network elements independent of services. The service management system also accepts data according to its order type. For instance, the service management system can identify data as implementing a new service, a change in an existing service, or a deletion of a service, and can validate order content state and sequence. The service management system can also identify data according to the data's action, including insert, delete, update and query actions.

The service management system validates data on several levels to limit or eliminate a need for validation on the network elements, thus supporting automatic provisioning of service to network elements with reduced system errors. A field level validation can ensure that schema-related commands correlate to field formats in the telephony database, including, for example, alphanumeric and range validation. A record level validation ensures referential integrity by checking for field existence for each action and for a future view of the service. The service management system can validate a user's exclusions and interaction limitations, and can audit usage for billing and marketing purposes.

The service management system stores data, and can store services and service offerings in different version records. A user can have an active service version, but can revert to older versions. Each version and related data can be stored according to a status, such as active, inactive, sending, pending, or saved to allow more efficient use of data storage hardware.

The service management system downloads data to network elements in a process known as provisioning. A scheduler can initiate provisioning at a predetermined time or date. Activation logic, created during deployment of the service definition package, issues service specific activation instructions to initiate the service on the network, determines an order for downloading, and failure options. Download can occur over common interfaces, such as CORBA, and can be managed with appropriate queue manipulation. The service management system ensures download of proper contents to proper network elements, and can convert and revalidate service data for a current view of the appropriate network elements.

Provisioning logic can be developed with the service creation environment and can include service specific and generic system building blocks to perform provisioning functions. The provisioning logic validates the data needed for functional operation of each service and ensures referential integrity of each service and database schema reference for network elements.

Activation logic can also be built with the service creation environment, but is specific for each service. Activation logic includes instructions for determining the order of downloading service functions, as well as options should the service fail. For instance, if the service fails along the network elements, activation logic can roll back the failed network elements, can roll back all network elements, or can direct continuation of the service despite the failure.

Figure 9:
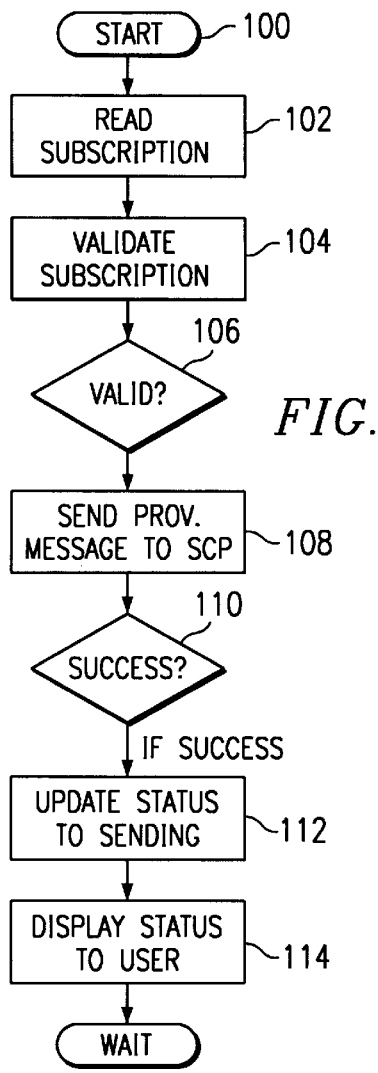
FIG. 9 depicts a flow diagram for the service management system to communicate telephony data to a telephony network.
Figure 11:
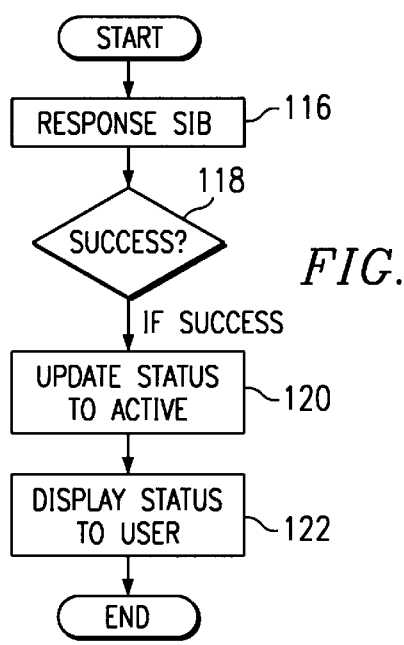
FIG. 11 depicts a flow diagram for the service management system for processing a service.

Activation logic is based on subscription data for each particular service. Each action requires separate logic, for instance, to insert, delete, modify or query a service. Referring to FIG. 9, a flow diagram of activation logic performed by the service management system for activation of a service is depicted. A user initiates an action, such as inserting subscription data to support a toll free number. At step 102, the service management system reads the subscription data and, at step 104, seeks to validate the form and substance of the subscription data. At step 106, the service management system makes a determination of the validity of the subscription data and, at step 108, sends a provisioning message to the service control point containing the subscription data for enablement of the service. At step 110, the service management system determines the success of the message transferred to the service control point and, at step 112, updates the provisioning status to sending to, at step 114, displays the status to the user. Referring to FIG. 11, the service control point provides a response to the service management system through a response system building block. At step 118, the service management system determines the success of insertion of the subscription data based on the response and, at step 120, updates the status of the service associated with the subscription data to the service management system for, at step 122, display to the user.

Figure 10:
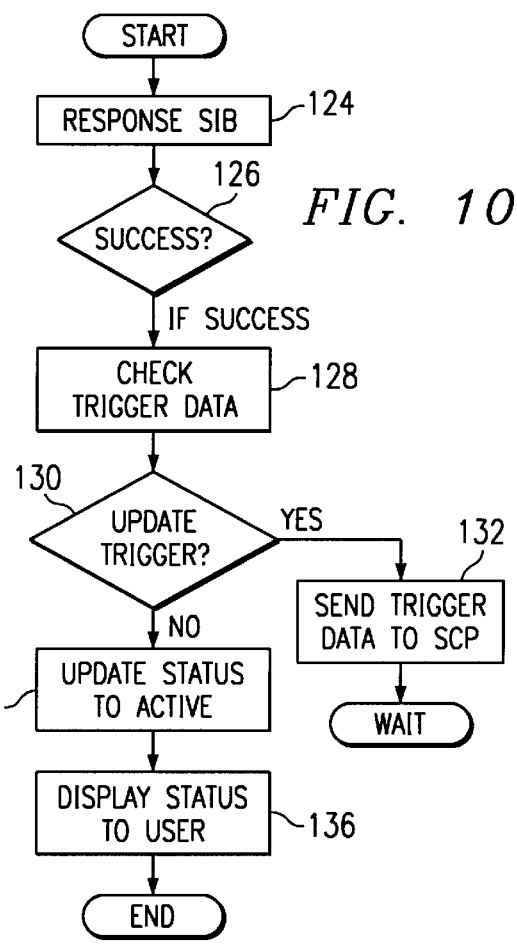
FIG. 10 depicts a flow diagram for the service management system for activating a service.

Referring to FIG. 10, service management system logic for responding to a provisioning of a service is indicated. At step 124, a response system building block accepts the response from the system control point to allow the service management system at step 126 to determine the success of the downloading of the service. At step 128, the service management system checks for trigger data to initiate operation of the service and, at step 130, determines if an update to the trigger data is needed. If an update is needed, at step 132, new trigger data is sent to the service control point. If no updated trigger data is needed, the service management system at step 134 updates the status of the service to active and, at step 136, displays the active status to the user. Each interface message can be supported by a system building block, and system building blocks can also invoke APIs.

To support provisioning and activation of a service and to prevent unauthorized access to telephony data, the service management system can partition telephony data into separate tables. For instance, one table can include user data, with administrative data for each user of the service management system having separate files. Another table can include subscription data to support services subscribed by each user. A third table can include network data such as switch data for each telephone company to support interaction of the services and the network. Finally, a fourth table can include service data such as the global variables, service logic programs, service triggers, and other essential telephony data for the functioning of a service. The service management system can isolate each partitioned data table to help ensure the integrity and security of essential telephony data.

Although the present invention has been described in detail, it should be understood that various changes, substitutions and alterations can be made hereto without departing from the spirit and scope of the invention as defined by the appended claims.

What is claimed is:

1. A method for controlling access to a telephony database with a graphical user interface, the database having a predefined schema for storing telephony data in the telephony database, the method comprising the steps of:

a) providing a logic analyzer, a schema query, a screen builder, and a screen interpreter;

b) generating executable code with the logic analyzer, the code for supporting interaction between the screen interpreter and the telephony database according to the schema query and the predefined schema;

c) using the schema query to direct the screen builder to assemble a screen for supporting the graphical user interface;

d) inserting the executable code into the screen assembled by the screen builder to create a service screen definition; and e) providing the service screen definition to the screen interpreter to enable a graphical user interface for interacting with the telephony database;

f) providing direct access for a subscriber to the telephony database through the graphical user interface, the subscriber operable to enable or modify services represented in the telephony database without service operator or service provider assistance.

2. A method according to claim 1 wherein the schema query corresponds to a telephony service.

3. The method according to claim 2 wherein the telephony service comprises a toll free telephone number service.

4. The method according to claim 3 wherein the schema query comprises a table associated with origin dependent routing for a toll free telephone service.

5. The method of claim 3 wherein the schema query comprises a table associated with time dependent routing for a toll free telephone service.

6. The method according to claim 1 wherein the screen builder is Spectle.

7. The method according to claim 1 wherein the screen interpreter comprises a native screen interpreter.

8. The method according to claim 1 wherein the screen interpreter comprises a world wide Web screen interpreter.

9. The method according to claim 1 wherein the telephony database has sensitive data, the method further comprising the step of:

d1) filtering sensitive data from the service screen definition.

10. The method according to claim 9 further comprising the steps of:

d2) formatting the service screen definition to provide a service view.

11. The method according to claim 1 further comprising the steps of:

f) creating a service management package comprising the service screen definition, the service management package defining a telephony service;

g) transferring the service management package to a service management system; and h) provisioning the service with the service management system to at least one telephony network element.

12. The method according to claim 11 further comprising the step of:

i) modifying the service with the service management system; and j) provisioning the modified service to at least one telephony network element.

13. The method according to claim 12 wherein step (i) further comprises the steps of:

(i1) providing a service management access point;

(i2) interfacing a data input device with the service management access point by using the service screen definition;

(i3) interfacing the service management access point with the service management system;

(i4) modifying the service with the data input device; and (i5) storing the modified service on the service management system.

14. The method according to claim 13 wherein step (i2) further comprises interfacing a plurality of data input devices with the service management access point by using the service screen definition.

15. The method according to claim 13 wherein the service screen definition comprises an world wide web screen interpreter and further wherein step (i2) comprises interfacing a data entry device with the service management access point through the world wide web.

16. A system for controlling access to a telephony database with a graphical user interface, the database having a predefined schema for storing telephony data, the telephony data for supporting one or more telephony services on a telephony network, the system comprising:

a service creation environment comprising:
   a screen builder;
   a logic analyzer for generating executable code to support graphical user interface interaction with the telephony database; and
   a schema query, the schema query for directing the screen builder to create a service screen definition, the schema query further for cooperating with the logic analyzer to insert executable code into the service screen definition;

a data entry device;

a screen interpreter, the screen interpreter cooperating with the service screen definition to display a graphical user interface on the data entry screen; and a service management system interfaced with the data entry screen, the service management system for provisioning telephony data to support a telephony service on a telephony network, wherein a subscriber has direct access to the telephony database through the graphical user interface using the data entry device, the subscriber operable to enable or modify services at the data entry device without service operator or service provider assistance.

17. The system according to claim 16 wherein the telephony network comprises a plurality of network elements for directing telephony communications according to one or more telephony services and wherein the service management system provisions at least one service to at least one network element.

18. The system according to claim 17 wherein the at least one network element comprises a service control point.

19. The system according to claim 17 wherein the service screen definition cooperates with the screen interpreter to display a graphical user interface having a service view.

20. The system according to claim 19 wherein the screen interpreter comprises a native screen interpreter.

21. The system according to claim 19 wherein the screen interpreter comprises a world wide web screen interpreter.

22. The system according to claim 21 further comprising a service management access point interfaced with the service management system and the data entry screen, the service management access point for accepting telephony data from the data entry screen and for communicating the telephony data to the service management system, the telephony data for supporting provisioning of at least one service by the service management system to the telephony network.

23. The system according to claim 22 wherein the service management access point accepts telephony data from a service subscriber.

24. A method for interacting with a telephony database, the database having a predefined schema defining at least one table, each of the at least one tables storing telephony data according to labels and entry points, the method comprising the steps of:

providing a schema query comprising predetermined telephony data labels;

generating executable code with a logic analyzer, the executable code for supporting interaction with the telephony data according to the schema query;

directing a screen builder to assemble a service screen definition, the service screen definition comprising the executable code;

interpreting the service screen definition with a screen interpreter to enable a graphical user interface;

displaying the graphical user interface on a display screen communicating with the screen interpreter;

allowing subscriber interaction with the telephony database through the graphical user interface so that the subscriber can enable or modify services represented in the telephony database without service operator or service provider assistance.

25. The method according to claim 24 wherein said directing a screen builder step further comprises the schema query directing the screen builder to assemble the service screen definition.

26. The method according to claim 25 wherein said interacting with the telephony database step further comprises communicating telephony data through the graphical user interface to a service management system, the service management system managing data stored in the telephony database.

27. The method according to claim 26 wherein the telephony database supports a telephony service, the method further comprising the step of provisioning the telephony service to a telephony network with the service management system according to the telephony data communicated through the graphical user interface.

28. The method according to claim 27 wherein the telephony service comprises a toll free telephony service for supporting a toll free telephone number.

29. The method according to claim 28 wherein the toll free telephony services comprise time dependent routing.

30. The method according to claim 26 wherein said displaying graphical user interface step further comprises displaying a graphical user interface on a data entry screen, the data entry screen communicating with a service management access point; and wherein said interacting with the telephony database steps further comprises communicating telephony data through the graphical user interface to the service management access point, the service management access point further communicating telephony data to the service management system.

31. The method according to claim 30 wherein said displaying graphical user interface step further comprises displaying a graphical user interface on plural data entry screens by communicating the service screen definition to a screen interpreter associated with each data entry screen, each data entry screen communicating with a service management access point.

32. The method according to claim 31 wherein the screen interpreter comprises a world wide web screen interpreter.

33. The method according to claim 31 wherein said interacting with the telephony database step is performed by a service subscriber.

* * * * *